Aug. 31, 1965   A. R. WHITTAKER ETAL   3,203,238
COMPOUND METER
Filed Feb. 12, 1962   5 Sheets-Sheet 1

INVENTORS
Alex R. Whittaker
Bernard Last
James F. Edwards, Jr.

BY
ATTORNEYS

Aug. 31, 1965  A. R. WHITTAKER ETAL  3,203,238
COMPOUND METER

Filed Feb. 12, 1962  5 Sheets-Sheet 3

INVENTORS
Alex R. Whittaker
Bernard Last
James F. Edwards, Jr.

BY
ATTORNEYS

Aug. 31, 1965 A. R. WHITTAKER ETAL 3,203,238
COMPOUND METER
Filed Feb. 12, 1962 5 Sheets-Sheet 4

INVENTORS
Alex R. Whittaker
Bernard Last
James F. Edwards, Jr.

BY *Strauch, Nolan & Neale*
ATTORNEYS

INVENTORS
Alex R. Whittaker
Bernard Last
James F. Edwards, Jr.

BY

ATTORNEYS

United States Patent Office 3,203,238
Patented Aug. 31, 1965

3,203,238
COMPOUND METER
Alex R. Whittaker, Fort Myers, Fla., Bernard Last and James F. Edwards, Jr., Uniontown, Pa., assignors to Rockwell Manufacturing Company, Pittsburgh, Pa., a corporation of Pennsylvania
Filed Feb. 12, 1962, Ser. No. 172,709
13 Claims. (Cl. 73—197)

This invention relates to compound meter assemblies and particularly to special structural arrangements therein contributing to improved overall operation and efficiency.

Meters of this type have been proposed and used as disclosed in United States Letters Patents No. 2,425,720 to Bergman dated August 19, 1947; No. 2,607,640 to Bergman dated August 19, 1952 and No. 2,764,022 to Hague dated September 25, 1956. In all of these patented meters the output shafts of a large flow meter and a low flow meter are connected through suitable gearing to drive a single register, and a pressure responsive valve controls bypass of the liquid being measured into said small flow meters under conditions of low flow in the line.

The present invention is directed to improved overall arrangements in such compound meters and detailed improvements such as the special incorporation of magnetic shaft supports and special output shaft drive arrangements in the large flow meter and magnetic coupling drives into the coordinator that drives the register.

It is, therefore, the major object of the invention herein to provide a compound meter assembly wherein the large and low flow meters are arranged in special relationship in novel drive association with improved internal meter construction and associated valving arrangements resulting in greatly improved overall efficiency and accuracy of registration.

A further object of the invention is to provide in a compound meter assembly novel association of a large flow rotary impeller type meter and a small flow nutating disc type meter connected to drive a single register.

It is a further object of the invention to provide in a compound meter a novel large flow meter of the rotary impeller type having a worm drive output and special radial and thrust bearing mountings for the impeller shaft.

Another object of the invention is to provide a novel magnetic coupling drive arrangement between the large flow and small flow meter output shafts and the register gearing in a compound meter.

A further object of the invention is to provide a novel magnetic shaft suspension for the rotary impeller in the large flow meter of a compound meter assembly.

Further objects of the invention will appear as the description proceeds in connection with the appended claims and the annexed drawings wherein:

Figure 1:
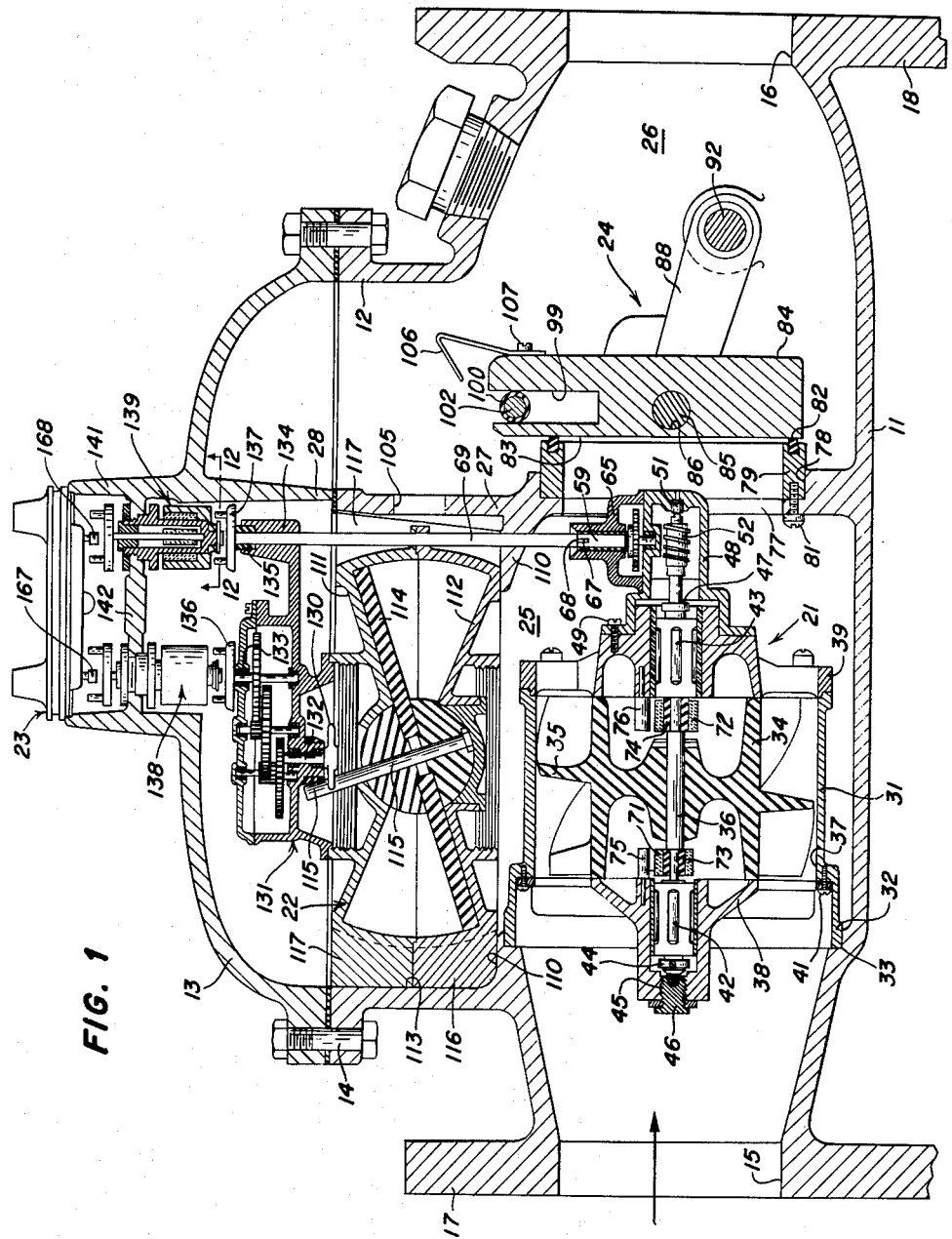
FIGURE 1 is a section through a compound meter assembly showing important details relating to the invention.

The compound meter assembly of the invention is mounted within a housing comprising an integral body 11 having closed side and bottom walls, end walls that are closed except for fluid passages, and a top wall having a large opening 12 over which is removably secured a cover 13 as by a series of bolt and nut assemblies 14. Fluid passages 15 and 16 are preferably of the same size and aligned axially of the body, and these passages are surrounded by flanges 17 and 18 respectively for coupling into a water main. Passage 15 is the inlet passage as shown by the arrow in FIGURE 1.

The essential components of the compound meter assembly are a large flow meter 21, a low flow meter 22, mechanism disposed mainly within housing cover 13 for applying the outputs of both meters to drive a coordinator 23 for driving a single register, and a valve assembly 24 that is open only when the large flow meter is being driven. Coordinator 23 is preferably that disclosed in U.S. Letters Patent No. 2,764,022 wherein drive inputs from large and low flow meters are correlated to provide a single output drive to a single register, here not shown but actually mounted on the housing cover 13 in the meter assembly.

The interior of the meter housing is divided into chambers 25 and 26 by a transverse body partition 27 which is aligned with a similar cover partion 28. The two meters and the output drive mechanism therefrom are located in chamber 25 which in normal operation contains the fluid being metered at inlet pressure, and the outlet chamber 26 contains the valve 24.

The large flow meter 21 is of the axial flow rotary impeller type and is mounted coaxially of inlet passage 15 and is supported by a casing 31 having at one end an annular extension 32 fixed in an internal body shoulder 33.

Meter 21 has a rotary impeller 34 formed with peripheral helical blades 35 and fixed upon a rotatable horizontal shaft 36 that is concentric with cylindrical chamber 37. End plates 38 and 39 close chamber 37 and, as illustrated in FIGURE 1, they limit axial shift of impeller 34. End plate 38 is removably secured to casing 31 as by screws 41, and end plate 39 is suitably secured to the other end of casing 31.

End plates 38 and 39 have aligned coaxial bores containing radial bearing assemblies 42 and 43 respectively radially journalling spaced ends of shaft 36, these bearings being preferably the caged hard rubber roller type disclosed in U.S. Letters Patent No. 2,607,640 issued August 19, 1952.

At one end shaft 36 carries an enlarged collar 44 and is formed with a ball and socket thrust bearing assembly 45 seated on an adjustable member 46 that is screw threaded into a center boss of end plate 38.

At its other end shaft 36 carries a similar collar 47 and extends within a gear casing 48 that is removably mounted on end plate 39 as by screws 49. The outer wall of casing 48 mounts a ball and socket thrust bearing assembly 51 engaged by the end of shaft 36.

The axial position of shaft 36 in the assembly and the the loading of thrust bearings 45 and 51 are determined by adjustment of member 46.

Figure 4:
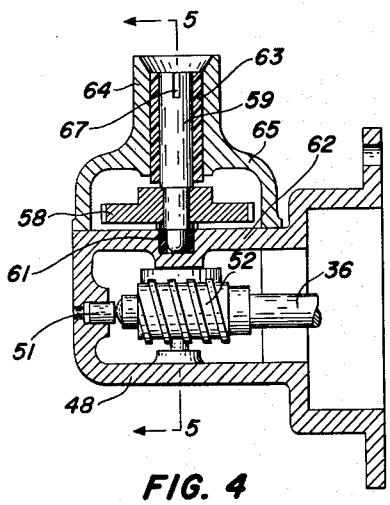
FIGURES 4 and 5 are fragmentary sectional views showing the worm gear drive of the large flow meter output shaft.
Figure 5:
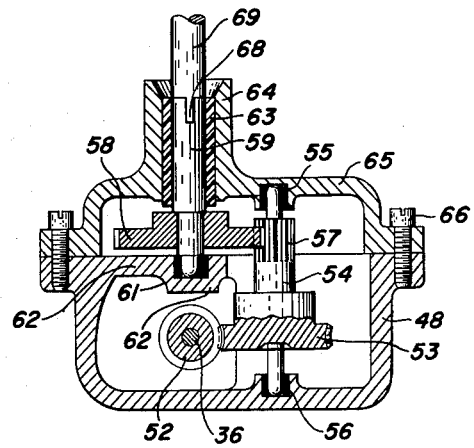

Within the casing 48, see FIGURES 1, 4 and 5, shaft 36 has fixed to it a worm 52 meshed with a gear 53 on a vertical stub shaft 54 freely journalled in upper and lower radial bearings 55 and 56 which are preferably rubber or Teflon sleeves. Shaft 54 carries a smaller gear 57 meshed with a gear 58 on a vertical stub shaft 59 rotatably mounted at its lower end in a bearing sleeve bearing 61 on an internal casing wall 62. The upper end of shaft 59 is journalled in a bearing sleeve 63 lining upwardly open casing boss 64. Boss 64 and bearing 55 are carried in the casing cover 65 which is secured to casing 48 as by screws 66.

The upper end of shaft 59 is diametrically slotted at 67 to removably receive in drive engagement a tongue 68 on the lower end of an elongated register drive shaft 69.

In order to lessen the radial, load and wear on bearings 42 and 43, a magnetic suspension is provided for shaft 36. This comprises annular collars 71 and 72 of ferrous magnetic material fixed through insulating collars 73 and 74 respectively on shaft 36 within opposite ends of meter chamber 37 and immediately adjacent the respective radial bearings 42 and 43. Fixed permanent magnets 75 and 76 project oppositely inwardly from the end plates above collars 71 and 72 respectively, and they exert a constant upward attraction and lift on collars 71 and 72 and therefore shaft 36 sufficient to effectively counterbalance the weight of the shaft and impeller assembly. This results in a substantially floating frictionless mounting for the impeller 34 and renders it more sensitively responsive to fluid flow to increase the meter accuracy. In a water meter where the water lubricates the hard rubber bearing rollers at 42 and 43, this has proved to be quite efficient.

Magnets 75 and 76 are preferably located in a vertical plane containing the axis of shaft 36.

Referring to FIGURE 1, an opening 77 is formed in body partition 27 surrounded on the outlet chamber side by an annular shoulder recess 78 mounting a valve seat ring 79 secured in place by screws 81. At its outlet end, seat ring 79 is grooved annularly to mount a resilient seat ring 82 which is adapted to be engaged by the flat face 83 of a block-like valve element 84 shown in closed position in FIGURE 1.

Figure 2:
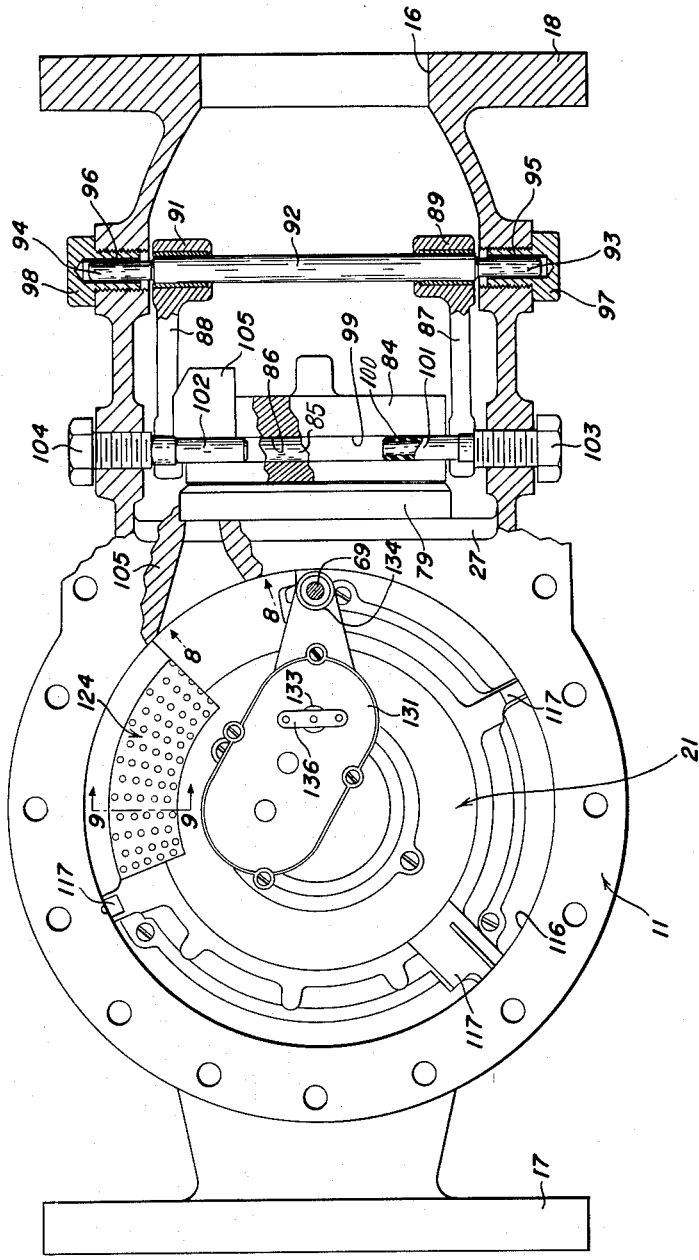
FIGURE 2 is a top plan view partly broken away and in section with the top cover removed showing the low flow meter in place and the flap valve support.
Figure 3:
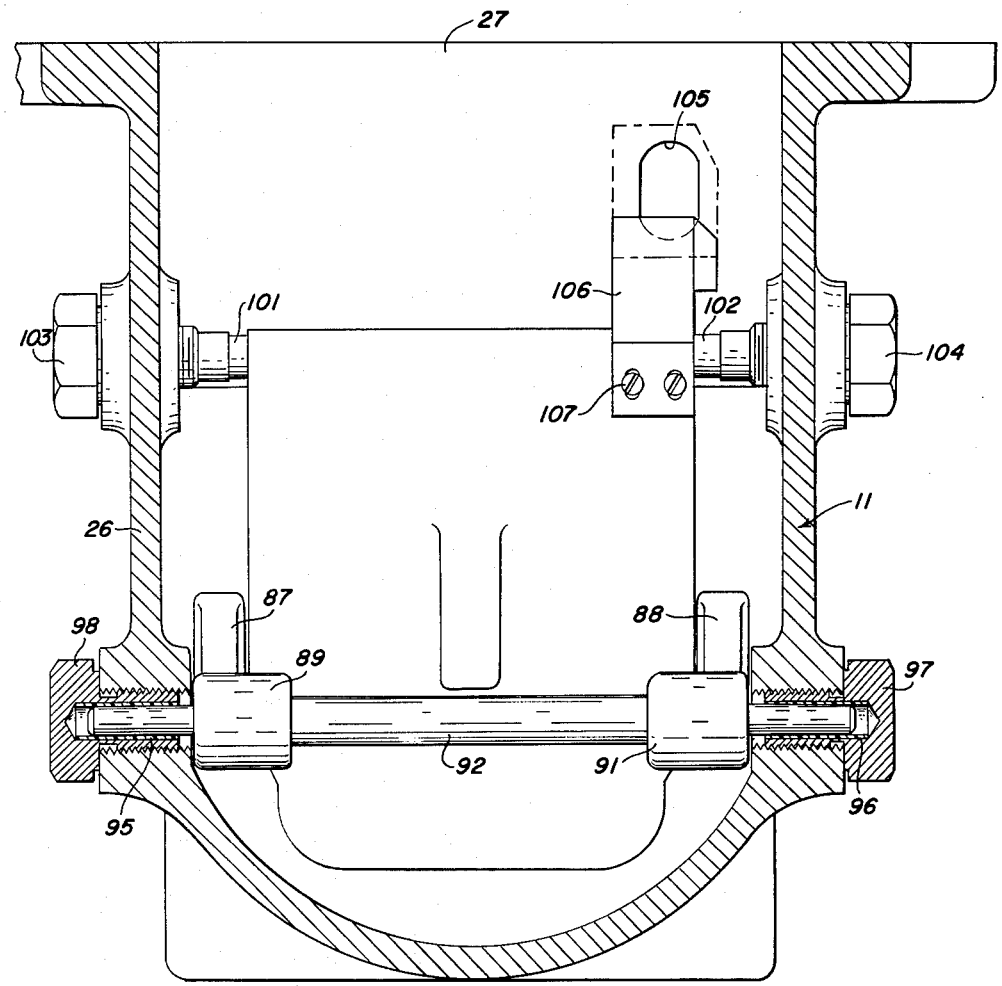
FIGURE 3 is an end elevation in section showing the low flow outlet and the flap valve mounting detail.

Referring to FIGURES 1 and 2, valve element 84 is freely pivoted at about its central portion on a horizontal axis on a horizontal shaft 85 extending rotatably through bore 86 and fixed at opposite ends to parallel arms 87, 88.

Arms 87, 88 are in turn secured at 89, 91 respectively upon a horizontal shaft 92 having reduced opposite ends 93, 94 respectively extending into bushing sleeves 95, 96 carried by externally accessible mounting members 97, 98 screw threaded into the side walls of body 11.

The upper end wall of element 84 is transversely slotted at 99 parallel to shafts 85 and 92, and axially aligned stub shaft pivots 101 and 102 extend into the opposite sides of slot 99, so that a slide pivot mount is here provided for valve element 84. Pivots 101 and 102 are the inner reduced ends of bolt-like members 103 and 104 screw threaded into the side walls of body housing 11. In practice, see FIGURE 1, the pivots 101, 102 comprise hard rubber rollers 100 freely rotatable on the bolt ends for reducing friction.

As shown in FIGURE 1, a port 105 is provided in partition 27 above the valve 24, and a flexible closure element therefore comprising a metal strip 106 is adjustably secured to valve element 84 as by slots and screws 107.

Valve element 84 is of such proportions and design as to swing open to uncover opening 77 when there is a predetermined velocity of flow of fluid through the meter assembly, and to be closed when the flow velocity is below that value. When valve element 84 is in open position, the flexible valve element 106 is pressed against partition 27 to substantially but not completely close port 105.

The mechanical operation of valve element in quickly swinging from closed to open position for large meter actuation of the register, and for swinging to closed position upon predetermined reduction of flow velocity is essentially the same as disclosed in U.S. Letters Patent No. 2,425,720 issued August 19, 1947. However, the present invention includes the novel feature of a spring gate such as at 106 mounted on valve element 84.

The low flow meter 22 is of the nutating disc type mounted in the housing body below the cover with its lower end seated on a ledge 110 and is composed of upper and lower casing halves 111 and 112 mating along horizontal rims at 113 to enclose a conventional type universally mounted nutating disc assembly 114 having a spindle 115 projecting upwardly through an aperture in the casing.

Figure 6:
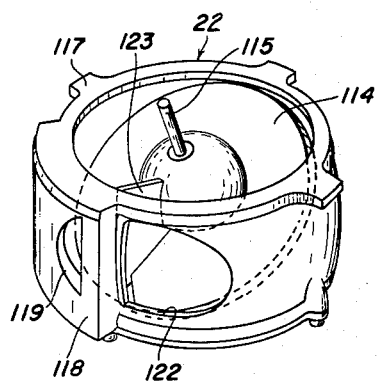
FIGURE 6 is an essentially diagrammatic perspective view showing the low flow meter.
Figure 7:
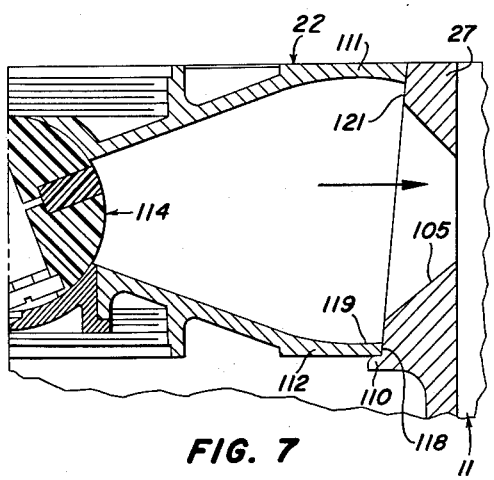
FIGURE 7 is a fragmentary section showing the low flow meter outlet port in seated association with the housing wall.
Figure 8:
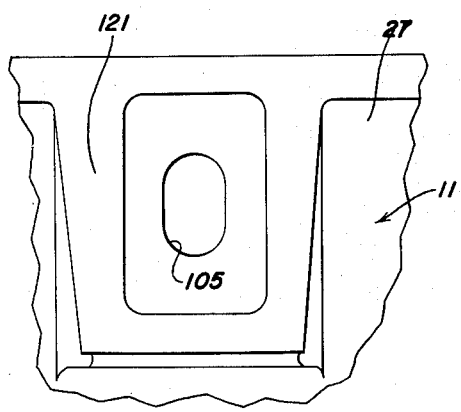
FIGURE 8 is a fragmentary elevation substantially on line 8—8 in FIGURE 2 showing the sealing surface around the outlet port in the housing wall.

Above ledge 110 the body is formed with an internal meter casing mounting wall 116 of slightly frusto-conical shape with its larger diameter at the upper end. The meter casing is formed with external radial ribs 117 which have their outer surfaces lying in the same conical envelope, and adjacent port 105 the meter casing is formed at 118 (FIGURES 6 and 7) with a frusto-conical smooth continuous surface lying in the same envelope and surrounding the outlet port 119 of the meter 22. When the meter 22 is in the assembly, surface 118 tightly and sealingly engages a similarly shaped smooth continuous surface 121 on the inner wall of partition 27 and surrounding port 105 as shown in FIGURE 8.

Figure 9:
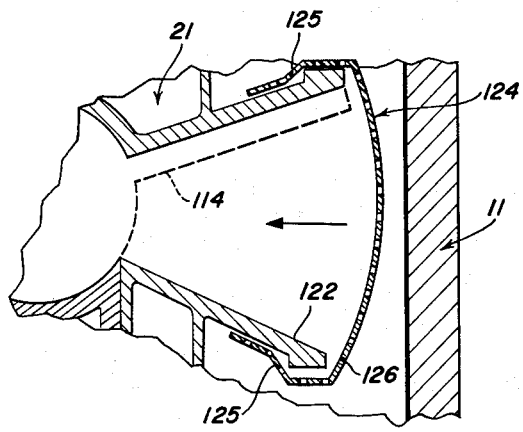
FIGURE 9 is a fragmentary section substantially along line 9—9 in FIGURE 2 showing the screen over the low flow meter inlet.
Figure 10:
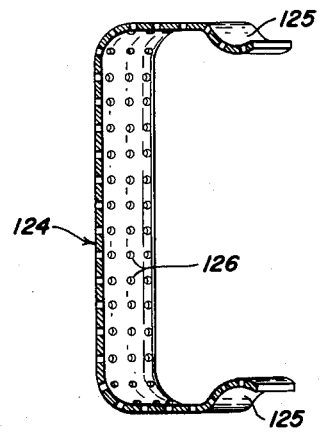
FIGURE 10 is a substantially perspective view of the perforated inlet screen apart from the meter.

An inlet port 122 (FIGURE 6) is formed in the casing of meter 22 separated from the outlet port by the usual division plate 123. Inlet port 122 in the assembly of FIGURE 1 is always open to the space around meter 22 which is filled with the inlet fluid of chamber 25. As shown in FIGURES 2 and 9, a screen 124 is removably mounted over the inlet port 122. This particular screen is a stiff but resilient one-piece perforated sheet of spring metal having upper and lower arms 125 (FIGURES 9 and 10) adapted to snap over the adjacent outer edges of the low flow meter casing. Screen 124 is shown in more detail in FIGURE 10, and the holes 126 are preferably about 1/8" in diameter to freely pass water at low flow rates but to intercept any large particles that might injure the internal meter construction.

Supported on meter 22 is a gear box 131 in which is journalled a vertical shaft 132 having a dog 130 drivingly engaged with spindle 115, and a set of reduction gearing within the box connects shaft 132 to drive a vertical output shaft 133. An integral extension of box 131 is formed with a boss 134 through which the upper end of vertical large flow meter shaft 69 extends with radial bearing at 135.

The upper ends of shafts 133 and 69 terminate in similar dogs 136 and 137 respectively, engaged to drive into coordinator 23 through similar magnetic drive coupling assemblies 138 and 139 respectively. The upper wall of cover 13 is formed with a hollow boss 141 closed at its upper end by coordinator 23. Within boss 141 is a transverse integral wall 142 supporting the magnetic couplings.

Figure 11:
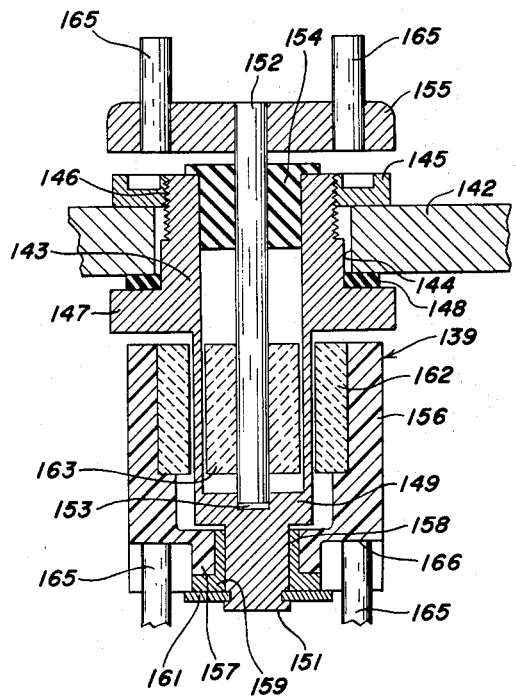
FIGURE 11 is a sectional view showing detail of one of the magnetic couplings in the drives to the register.

Each magnetic coupling (FIGURE 11) comprises a metal support column 143 passing through aperture 144 in wall 142 and secured to wall 142 by a nut 145 on its threaded upper end 146 cooperating with an annular flange 147 below wall 142. A compressible seal gasket 148 is interposed between flange 147 and the wall 142, so that when nut 145 is drawn tight opening 144 is fluid tight and support 143 is rigid with the meter housing.

Support 143 is hollow and integrally closed at its lower end by a bottom wall 149 and a downwardly extending post 151. A driven vertical shaft 152 of stainless steel is centered in support 143, has its lower end mounted in a thrust bearing 153 in wall 149, and has its upper end radially journalled in a bronze or hard rubber bushing 154 which otherwise closes the hollow upper end of the support. A driving dog 155 is fixed upon the upper end of shaft 152.

Below flange 147, an annular magnet holder 156 has its lower end formed as a boss 157 surrounding a hard rubber bushing 158 on post 151, and bushing 158 has a radial portion 159 underlying the flat lower end of boss 157. A retainer ring 161, which may be a conventional snap ring fitting into a groove on post 151, is removably mounted on post 151 and it underlies bushing 158. By the foregoing construction, the magnet holder 156 is freely rotatably mounted on support 143 coaxially of shaft 152.

An annular drive magnet 162 is secured within holder 156, and a cooperating annular driven magnet 163 is fixed on shaft 152, these magnets being axially coestensive. Preferably, these magnets are of the ceramic type molded to suit space conditions.

Figure 12:
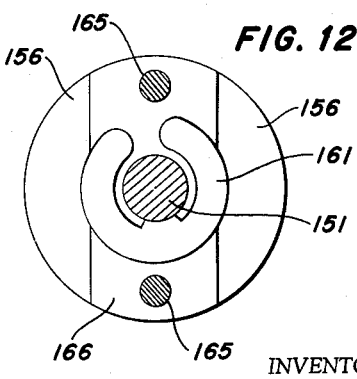
FIGURE 12 is a fragmentary section on line 12—12 of FIGURE 1.

As shown in FIGURE 12, the pins 165 and dog 137 extend into driving engagement with the magnet holder 156 at the slotted lower end at 166. A suitable dog drive arrangement is of course provided between the upper ends of couplings 138 and 139 and the depending input shafts 167 and 168 of coordinator 23.

In operation, water or other liquid entering at 15, when the flow velocity is below a certain value so that valve 24 is closed as in FIGURE 1, passes through the low flow meter 22 and the output shaft 133 drives the register through coupling 138 and coordinator 23. When the inlet fluid flow reaches a certain velocity, valve 24 quickly opens and shaft 69 is driven to drive the register through coupling 139 and the coordinator 23, which latter drives the register from whichever of shafts 133 or 69 is rotating faster.

The special magnetic impeller shaft suspension and cooperating worm gear drive to shaft 69 provide an improved sensitivity of meter operation, whereby the large flow meter is more accurate particularly at the point of transition from low flow to high flow in the compound meter. The improved valve mounting at 24 further increases this accuracy by insuring speedy opening and closing of the valve in response to fluid flow velocity change. The magnetic drive couplings at 138 and 139 are sealed against internal corrosion by the water or other line fluid.

An important part of the invention lies in the discovery that the combination of an axially flow rotary impeller large flow meter and a nutating disc type low flow meter produces unusually efficient operation in a compound meter of this type.

The invention may be embodied in other specific forms without departing from the spirit or essential characteristics thereof. The present embodiments are therefore to be considered in all respects as illustrative and not restrictive, the scope of the invention being indicated by the appended claims rather then by the foregoing description, and all changes which come within the meaning and range of equivalency of the claims are therefore intended to be embraced therein.

What is claimed and desired to be secured by Letters Patent is:

1. In a compound meter assembly, a casting having opposed substantially aligned inlet and outlet openings for connection to a pipeline, said casing being otherwise closed at the bottom and sides and open at the top, a large flow meter mounted in the lower end of said casing in the path of liquid entering the inlet and comprising a housing enclosing a rotary impeller having a horizontally disposed shaft supported in bearings on said housing, said casing and housing providing a substantially straight through passage for fluid between said openings, a low flow meter mounted in said housing above the level of said large flow meter, an internal wall in said casing separating the interior thereof into an inlet liquid chamber surrounding both meters and connected to the inlet opening and an outlet liquid chamber connected to the outlet opening, said wall having an aperture aligned with and adjacent the large flow meter, a swingable flow responsive valve assembly in said outlet chamber for closing said aperture when the velocity of liquid flow through the compound meter is below a certain value, a gear reduction assembly carried by a support mounted on the low flow meter and including an upwardly extending output shaft, an upwardly extending large flow meter output shaft journalled at its upper end on said support, a cover secured over said casing opening, fluid tight magnetic drive couplings mounted on said cover with their lower ends axially detachably connected to said output shafts, and register drive mechanism on said cover connected to the upper ends of said drive couplings.

2. In the compound meter assembly defined in claim 1, said wall having a further aperture disposed adjacent the low flow meter, and gate means on the valve assembly coacting with said further aperture when the valve assembly swings to open the first named aperture.

3. In the compound meter assembly defined in claim 2, said means on the valve assembly comprising a flexible plate.

4. In the compound meter assembly defined in claim 1, said casing comprising an internal ledge above the large flow meter and an upstanding peripheral wall formation for snugly receiving said low flow meter.

5. In the compound meter assembly defined in claim 4, a portion of said wall formation being on the inlet chamber side of said internal casing wall and said internal wall having a second aperture opening through said portion, and said low flow meter comprising a housing formed with an outlet opening, with said second aperture and housing outlet opening being surrounded by smooth continuous surfaces that are sealingly engaged when the low flow meter is installed in the assembly.

6. In the compound meter assembly defined in claim 5, said low flow meter housing having an inlet opening into said inlet liquid chamber, and a filter screen removably mounted over said inlet opening.

7. In the compound meter assembly defined in claim 6, said screen being a unitary perforated flexible sheet metal element.

8. In a compound meter assembly wherein a large flow meter is mounted in the path of fluid flow, said large flow meter comprising a fixed cylinder having a horizontal axis and opposed end members, an impeller shaft on the cylinder axis mounted in radial bearings on the end members and having a terminal projecting through one of said end members, a support fixed on said one of said end members, a vertical shaft mounted at its lower end on said support, gearing on said support drive connecting said shafts, thrust bearings on said other end member and said support engaging opposite ends of said impeller shaft, and means within the cylinder for magnetically suspending the impeller shaft to reduce radial bearing wear.

9. In the compound meter assembly defined in claim 8, said magnetic suspension means comprising magnets extending into said cylinder from the respective end members adjacent the radial bearings and coacting magnetic portions on said impeller shaft.

10. In the compound meter assembly defined in claim 9, said support being a housing enclosing said gearing, the associated impeller shaft terminal and the lower end of said vertical shaft.

11. In a meter assembly, means defining a substantially horizontal fluid flow passage, a rotary impeller adapted to be driven by fluid flow through said passage and having shaft means projecting oppositely axially therefrom, radial bearings in said assembly journaling said shaft means on a substantially horizontal axis, and means within the assembly for magnetically suspending said shaft means at both sides of said impeller for reducing radial bearing wear, said means for magnetically suspending said shaft means comprising annular magnetic members fixed on said shaft means between opposite ends of said impeller and said radial bearings and cooperating fixed magnetic members extending longitudinally coextensively with said annular magnetic members mounted directly above each of said annular magnetic members, at least one of each of said cooperating magnetic members being a permanent magnet.

12. In a meter assembly means defining a substantially horizontal fluid flow passage, a rotary impeller having an impeller shaft adapted to be driven by fluid flow through said passage journaled on radial bearings for rotation on a substantially horizontal axis, and means within the assembly for magnetically suspending the impeller shaft to reduce radial bearing wear comprising an annular magnetic member fixed on said shaft and a fixed magnetic member mounted directly above said annular magnetic member, at least one of said magnetic members being a permanent magnet and said fixed magnetic member being a bar extending longitudinally coextensively with said annular magnetic member substantially parallel to the axis of rotation of said shaft and lying substantially in a vertical plane containing the axis of said shaft.

13. In a compound meter assembly, a casing having opposed inlet and outlet openings for connection to a pipeline, said casing being otherwise closed at the bottom and sides and open at the top, a large flow meter mounted in the lower end of said casing in the path of liquid entering the inlet and comprising a housing enclosing a rotary impeller having a horizontally disposed shaft supported in bearings on said housing, a low flow meter mounted in said housing above the level of said large flow meter, an internal wall in said casing separating the interior thereof into an inlet liquid chamber surrounding both meters and connected to the inlet opening and an outlet liquid chamber connected to the outlet opening, said wall having an aperture aligned with said large flow meter, a swingable flow responsive valve assembly in said outlet chamber for closing said aperture when the velocity of liquid flow through the compound meter is below a certain value, a gear reduction assembly mounted above the low flow meter and including an upwardly extending output shaft, an upwardly extending large flow meter output shaft parallel to said low flow meter shaft, a cover secured over said casing opening, fluid tight magnetic drive couplings mounted on said cover with their lower ends axially detachably connected to said output shafts, and register drive mechanism on said cover connected to the upper ends of said drive couplings.

References Cited by the Examiner

UNITED STATES PATENTS

| | | | |
|---|---|---|---|
| 771,826 | 10/04 | Lohse | 73—231 |
| 1,245,740 | 11/17 | Krieg | 73—197 |
| 1,845,464 | 2/32 | Weymouth | 73—197 |
| 2,582,788 | 1/52 | Mendelsohn | 308—10 |
| 2,607,640 | 8/52 | Bergman | 73—197 X |
| 2,770,131 | 11/56 | Sparling | 73—231 |
| 2,941,402 | 6/60 | Scanes | 73—230 |
| 2,962,895 | 12/60 | Rumble | 73—231 X |
| 3,035,442 | 5/62 | Dunn | 73—258 |

RICHARD C. QUEISSER, *Primary Examiner.*

ROBERT L. EVANS, *Examiner.*

UNITED STATES PATENT OFFICE
CERTIFICATE OF CORRECTION

Patent No. 3,203,238                                              August 31, 1965

Alex R. Whittaker et al.

It is hereby certified that error appears in the above numbered patent requiring correction and that the said Letters Patent should read as corrected below.

Column 5, line 63, for "casting" read -- casing --.

Signed and sealed this 5th day of April 1966.

(SEAL)
Attest:

ERNEST W. SWIDER                                     EDWARD J. BRENNER
Attesting Officer                                         Commissioner of Patents